United States Patent [19]

McDonald

[11] 3,852,741
[45] Dec. 3, 1974

[54] NOZZLE AREA MEASUREMENT

[75] Inventor: George B. McDonald, Ottawa, Canada

[73] Assignee: Control Data Canada, Ltd., Willowdale, Ontario, Canada

[22] Filed: June 11, 1973

[21] Appl. No.: 368,810

[52] U.S. Cl.................. 343/5 R, 60/242, 73/117.4, 324/58.5 B
[51] Int. Cl............................ G01s 9/02, G01l 5/14
[58] Field of Search......... 343/5 R; 73/117.4, 117.3, 73/116; 324/58.5 B, 58.5 A; 60/242

[56] References Cited
UNITED STATES PATENTS

| | | | |
|---|---|---|---|
| 2,640,190 | 5/1953 | Rines | 324/58.5 B |
| 2,941,399 | 6/1960 | Bersinger | 73/117.4 |
| 3,019,604 | 2/1962 | Hall | 73/117.4 |
| 3,513,692 | 5/1970 | Slone | 324/58.5 A UX |
| 3,562,642 | 2/1971 | Hochschild | 324/58.5 B |
| 3,703,825 | 11/1972 | Merlo | 73/116 |

Primary Examiner—Maynard R. Wilbur
Assistant Examiner—G. E. Montone
Attorney, Agent, or Firm—Roylance, Abrams, Berdo & Kaul

[57] ABSTRACT

The apparatus determines the area of variable openings in a jet engine using radar techniques, and is particularly useful in determining the nozzle exit area. A radar antenna is mounted within the diffuser and is directed towards the nozzle so that a radar signal will impinge on the vanes defining the nozzle opening. Radar apparatus is connected to the antenna to provide the signal to be radiated and to receive the reflected signal. The reflected signal is related to the area of the opening and may be used to drive a display device to show the opening area. The signal representing nozzle area $A_8$ may be used with a signal representing static pressure at the nozzle entrance $P_{SN}$ and a signal representing ambient static pressure $P_{SO}$ to compute gross thrust.

8 Claims, 4 Drawing Figures

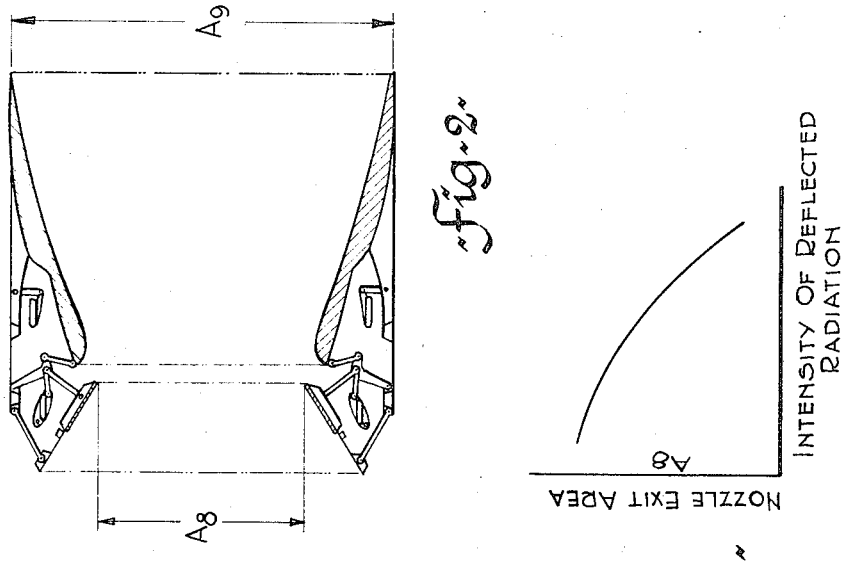
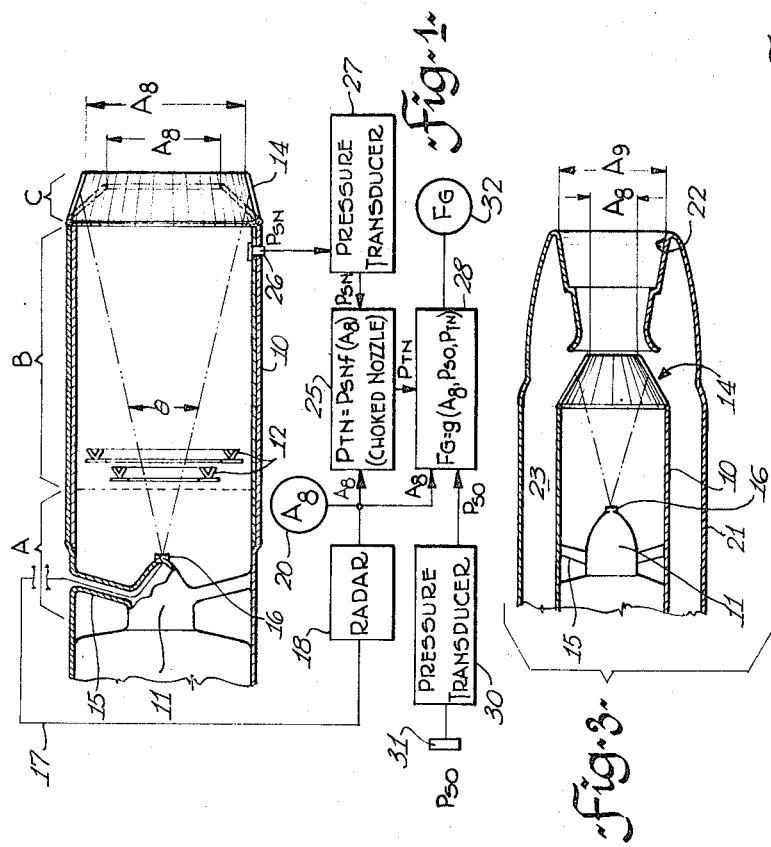

NOZZLE AREA MEASUREMENT

BACKGROUND OF THE INVENTION

This invention relates to the measurement of the area of variable openings in a jet engine.

It is desirable to be able to determine the size of variable openings such as inlet and outlet openings in a jet engine. It is particularly important to be able to determine the nozzle exit area in a jet engine having a variable nozzle exit area. The nozzle exit area is a very useful parameter. It is very useful in the determination of the gross thrust of a jet engine. The nozzle exit area provides useful information on an aircraft engine for the pilot, aircrew and maintenance crew. The nozzle exit area is a parameter useful in the control of afterburner fuel.

However, the determination of gross thrust is important and the accurate measurement or representation of nozzle area is particularly useful for this. The invention will be described with this in mind. Very generally there are three variables involved in the determination of gross thrust. These variables are: the ambient static pressure $P_{SO}$, the nozzle total pressure $P_{TX}$ and the nozzle exit area $A_8$. The ambient static pressure is conveniently available from the flight instrumentation in the aircraft. The nozzle total pressure is difficult to determine without using an immersed probe, and the nozzle area is difficult to determine accurately in an operating engine. Various techniques have been devised to determine gross thrust without a direct measurement of nozzle total pressure $P_{TX}$ or direct measurement of nozzle exit area $A_8$.

A convenient technique or system for determining gross thrust is available if nozzle exit area can be determined with sufficient accuracy.

At the present time, military jet engines and some civilian jet engines employ a variable nozzle which is adjusted or controlled to give optimum operation at given settings of throttle and afterburner fuel flow under different flight conditions. In most of these engines the variable nozzle comprises a plurality of vanes fastened to the tail pipe at the downstream end. A vane actuator, operated mechanically, electrically or hydraulically, positions the vanes to alter or adjust the exit area. The vanes may be hinged or may slide or run on track. It is obvious that information regarding nozzle area can be derived from the vane actuator position and this has been done in the past. However, the mechanical linkages are subject to thermally induced errors, wear and consequent lost motion, backlash, and variable friction factors. The net result of these uncontrolled factors resulted in a nozzle area exit signal which was not sufficiently accurate for use in the determination of gross thrust.

A more refined approach was proposed in the past, in which the nozzle vanes were each fitted with a small strut and pulley, over which a flexible cable was strung so as to encircle the vane assembly. The cable was fixed to one vane or leaf and was guided circumferentially around the vane assembly to the vane or leaf adjacent the one to which the cable was fixed. The cable was then led back to a spring tensioning device and a vane position transducer. In such a prior art arrangement the cable is always under tension which eliminates lost motion. However, the cable is subjected to considerable temperature change and this has an undesirable effect on accuracy. Moreover, the presence of the cable and struts disturbs the airflow over the outside of the vane assembly. This is of particular significance in a two stream engine where a disturbance of the outer flow would seriously degrade engine performance.

Neither of these prior art mechanical systems for indirect measurement can indicate changes in nozzle exit area by deformation or by expansion and contraction as a result of temperature effects, or severe changes in nozzle configuration such as might be caused by damage or loss of a nozzle vane.

It has also been suggested that certain optical arrangements might be used to determine nozzle exit area. These optical arrangements generally introduce severe problems of system complexity and signal-to-noise ratio which tend to make them impractical for use in an aircraft jet engine, particularly for in-flight use.

The present invention seeks to overcome the disadvantages of the prior art by providing apparatus for directly measuring nozzle exit area.

It is therefore an object of this invention to provide an apparatus for directly measuring the area of variable openings in a jet engine, such as inlet opening area and the exit area of a nozzle in a jet engine.

It is another object of the invention to provide apparatus for determining the area of variable openings in a jet engine using radar techniques.

It is yet another object of this invention to provide apparatus for determining the nozzle exit area of a jet engine that will function on the ground or in-flight and will provide a representation of nozzle exit area useful in determining engine gross thrust.

It is yet another object of this invention to provide apparatus capable of indicating certain faults or malfunction of the variable nozzle.

The present invention is for apparatus for determining the size of an opening in a jet engine. A radiation source is mounted within the engine and is directed to radiate towards the opening which is normally defined by movable vanes, so that the radiation impinges on the vanes or other components defining the opening as well as passing through the opening. A radiation detector mounted within the engine receives radiation reflected from the vanes or other components defining the opening and provides an output signal related to the received reflected radiation and representing the area of the opening.

In one embodiment the radiation source is an antenna means connected with a radar means to generate a radar signal and direct it towards the opening, and to receive the reflected radiation for use in providing the output signal representing the area of the opening.

The apparatus is particularly suited for determining the size of the variable opening of the exit area $A_8$ in a variable nozzle of a jet engine.

Another embodiment of the invention is for apparatus for determining the gross thrust of a jet engine utilizing the signal representing the nozzle opening area $A_8$ in conjunction with a signal representing the static pressure $P_{SN}$ at the nozzle entrance and ambient static pressure $P_{SO}$.

It will be seen that the apparatus of the invention not only determines nozzle area directly and may also determine gross thrust using this nozzle area, but the apparatus can also be used to show a malfunction such as a damaged or missing vane and can be used to indicate when thrust reversers are positioned in the jet discharge.

The invention will be described in more detail with reference to the accompanying drawings, in which:

FIG. 1 is a schematic sectional view of a part of a jet engine with a variable nozzle, showing apparatus according to the invention, FIG. 2 is a sectional view of a convergent-divergent variable nozzle, FIG. 3 is a schematic sectional view of part of a two stream type of jet engine with a variable nozzle, indicating the position of the apparatus of the invention, and FIG. 4 is a graph useful in describing the invention.

Referring to FIG. 1 there is shown in schematic form the rear portion of an afterburning type jet engine with a variable exhaust nozzle. The engine has a diffuser region A, a tailpipe or afterburning region B, and a nozzle region C. A rear bullet or afterbody 11 is in the diffuser region to assist in establishing a favourable air flow. It is supported by struts 15. In the tailpipe region there is a tailpipe 10 and a flameholder or gutters indicated at 12. The flameholders for the afterburner are in the general form of rings. In the nozzle region a variable nozzle 14 has an open position shown by solid lines and a closed or choked position shown by broken lines. The area or opening defined by the ends of the vanes is the nozzle exit area and it is referred to as $A_8$ (that is, the area at station 8). The operating mechanism for the vanes of the variable nozzle is not shown as such mechanism are well known in the art.

The engine described so far is known in the prior art.

A small radar antenna 16 is mounted at the apex of bullet 11 and is connected by a conductor 17 through one of the hollow supporting struts 15 to a radar apparatus 18. The operating frequency of output frequency of radar apparatus 18 and the antenna 16 are selected to provide an angle of radiation such that the cone of radiation strkes the vanes of the nozzle when the nozzle is in its fully open position as shown. It will be seen that the amount of reflected energy will vary in accordance with the exit area of the nozzle. The relationships between nozzle area $A_8$ and the intensity of reflected radiation can be determined accurately and an example is indicated in FIG. 4. Thus, the intensity of reflected radiation can be calibrated with respect to nozzle area, and can be represented by a signal applied to display indicator 20 to display nozzle area.

The radar apparatus 18 may be a pulse radar type or a continuous radiation type. A continuous radiation type of radar may require two antennas, one for transmitting and one for receiving, and both would be monted on bullet 11.

In the past it has been suggested that ions present in the exhaust gases of a jet engine would interfere with radio frequency propagation. However, experimental work done in connection with this invention indicates this is not so. Tests were carried out at 400, 800, 1000, 3000, 5000 and 10,000 megahertz showed no appreciable attenuation caused by ionization in the hot exhaust gases of a jet engine.

Referring now to FIG. 2 there is shown in section a variable nozzle of the convergent-divergent type. The narrow part or neck is station 8 and this is the place where the nozzle area $A_8$ is determined. The station 9 is at the end of the nozzle and the area here may be referred to as $A_9$.

Convergent-divergent nozzles are known and FIG. 2 is used only to indicate the location of $A_8$ and $A_9$.

Referring to FIG. 3, there is shown the rear or aft part of a two stream type of jet engine where the inner portion is substantially the same as the rear portion of the engine as shown in FIG. 1. There is an outer casing 21 which provides a passageway 23 for the flow of cool air which is guided past the variable nozzle 14 where it meets the discharge from nozzle 14 and exits through the secondary nozzle 22. This is a known type of engine installation and the exit area $A_8$ of nozzle 14 is indicated as well as the area $A_9$ of secondary nozzle 22. A radar antenna 16 is mounted on bullet 11 and functions in the same way as described in connection with FIG. 1.

The apparatus described will determine the nozzle exit area $A_8$ with accuracy not heretofore achieved in jet engines under operating conditions.

The value $A_8$ may be used in the determination of gross thrust, and this use of the invention will be described.

For a simple convergent nozzle the gross thrust of the jet engine may be defined as:

$F_G = A_8 \cdot P_{SO} \cdot g_I (P_{TN}/P_{SO})$    for complete expansion
$F_G = A_8 \cdot P_{SO} \cdot g_C (P_{TN}/P_{SO})$    for complete expansion Where:
$F_G$ = gross thrust
$A_8$ = nozzle exit area
$P_{SO}$ = ambient static pressure
$P_{TN}$ = nozzle total pressure
$P_{TN}/P_{SO}$ = nozzle pressure ratio
$g_I (P_{TN}/P_{SO})$ = a function of nozzle pressure ratio for incomplete expansion
$g_C (P_{TN}/P_{SO})$ = a function of nozzle pressure ratio for complete expansion For a convergent-divergent type nozzle with independent control of nozzle areas $A_8$ and $A_9$, there is a similar relationship and only complete expansion need be considered as this type of nozzle can ideally expand the exhaust gases to ambient static pressure. The gross thrust may be defined as:

$$F_G = A_9 \cdot P_{SO} \cdot f_C (P_{TN}/P_{SO}) \qquad 3.$$

where:
$F_G$ = gross thrust
$A_9$ = nozzle exit area at station 9
$P_{SO}$ = ambient static pressure
$P_{TN}$ = nozzle total pressure
$f_C (P_{TN}/P_{SO})$ = a function of the nozzle pressure ratio If the expansion is complete at station 9 it will not be complete at station 8, then we can rewrite equation (3) as follows:

$$F_{GP} = A_8 \cdot P_{SO} \cdot f_I (P_{TN}/P_{SO}) \qquad 4.$$

where:
$F_{GP}$ = primary gross thrust
$A_8$ = nozzle exit area at station 8
$P_{SO}$ = ambient static pressure
$f_I (P_{TN}/P_{SO})$ = a function of the nozzle pressure ratio The two steam engine of FIG. 3 requires a slightly different treatment. Since the primary purpose of the outer stream is normally for cooling, the gross thrust determination in flight is concerned with the thrust produced by nozzle 14. The primary exhaust gases are not fully expanded at station 8, which is the engine exit station. Use is therefore made of the following equation to determine the primary gross thrust:

$$F_{GP} = A_8 \cdot P_{SO} \cdot f_1 (P_{TN}/P_{SO}) \qquad 5.$$

where:
$F_{GP}$ = primary gross thrust
$A_8$ = nozzle exit area
$P_{SO}$ = ambient static pressure
$f_1 (P_{TN}/P_{SO})$ = a function of nozzle pressure ratio at station 8 for a choked convergent nozzle.

Thus it will be seen that an accurate determination of the nozzle exis area at station 8 may be used to determine gross thrust for any type of nozzle configuration. The nozzle total pressure can be measured with a probe in a non-afterburning engine, and in an afterburning engine may be determined as will be described hereinafter.

It is useful to know nozzle total pressure when the afterburner is operating as this may be used in the relationship previously indicated, along with nozzle area, to determine gross thrust. Because an immersed total pressure probe has a very short life when subjected to an afterburning environment, it is very desirable to determine nozzle total pressure in another manner. Prior teachings have revealed a simple relationship linking nozzle total pressure $P_{TN}$ to the jet engine primary exhaust area $A_8$ and nozzle entrance static pressure $P_{SN}$. This relationship is $$P_{TN} = P_{SN} \cdot f(A_8) \qquad 6.$$

Therefore, the afterburning primary gross thrust can be calculated using the following relationship:

$$F_{GP} = g(A_8, P_{SO}, P_{SN}) \qquad 7.$$

Referring again to FIG. 1, a signal representing nozzle exit area $A_8$ is applied to 25, as well as a signal representing $P_{SN}$ from a tap 26 and pressure transducer 27. The block 25 represents computer circuitry which solves the relationship of equation (6) above and provides an output signal representing nozzle total pressure $P_{TN}$. The signal representing $P_{TN}$ and the signal representing $A_8$ are both applied to a block 28 representing computer circuitry. Also applied to block 28 is a signal from pressure transducer 30 representing ambient static pressure $P_{SO}$. The transducer 30 may be connected to a source 31 of ambient static pressure $P_{SO}$ such as is available in the aircraft instrumentation.

Computer circuitry of block 28 solves the relationship of equation (7) above to provide an output signal representing gross thrust $F_G$ which may be used to drive a thrust meter 32.

The value of $A_8$ must be determined with considerable accuracy to be useful in determining gross thrust in this manner, and the prior art mechanical measurement of $A_8$ was not able to achieve sufficient accuracy.

It will be apparent to those skilled in the art that apparatus according to the invention could be used to determine the area of other openings, such as, for example, an intake opening on a jet engine where the engine has a variable intake opening.

I claim:
1. Apparatus for determining the area of an opening defined by components of a jet engine, comprising
   a radiation source mounted within said engine for directing electromagnetic radiation towards said opening to impinge on said components defining said opening and to pass through said opening,
   a radiation detector mounted within said engine for receiving radiation reflected from said components defining said opening, and for providing an output signal related to the intensity of the received reflected radiation representing the area of the opening.

2. Apparatus for determining the area of a variable opening defined by variable vanes in a jet engine, comprising
   antenna means mounted within said engine for directing electromagnetic radiation towards said movable vanes and for receiving radiation reflected therefrom, and
   radar means connected to said antenna means for generating a signal for radiation by said antenna means and for receiving reflected radiation, said radar means providing an output signal related to the intensity of the received reflected radiation representing the area of the opening.

3. Apparatus for determining nozzle exit area in a jet engine having a diffuser, a tailpipe and a variable nozzle, said variable nozzle having a plurality of movable vanes defining the nozzle exit area opening, said apparatus comprising
   antenna means mounted in said diffuser for directing radiation towards said nozzle for impingement upon said vanes and for receiving radiation reflected from said vanes, and
   radar means connected to said antenna means for generating a signal for radiation by said antenna means and for receiving reflected radiation, said radar means providing an output signal related to the amount of received reflected radiation representing nozzle exit area.

4. Apparatus as defined in claim 3 in which said antenna means is a perabolic reflector type antenna and in which said radar means is a probe type transmitter and receiver and includes means for effectively disconnecting said receiver during pulse generation.

5. Apparatus as defined in claim 3 in which said antenna means is a transmitting and a receiving radar antenna, and in which said radar means is a continuous wave radar transmitter connected to the transmitting antenna and a radar receiver connected to the receiving antenna.

6. Apparatus as defined in claim 3 and further including apparatus for utilizing said output signal representing nozzle exit area $A_8$ for determining gross thrust of said engine and providing a final output signal representing gross thrust comprising
   first pressure responsive means for detecting static pressure at the nozzle entrance $P_{SN}$ and for providing a signal representing $P_{SN}$,
   first computer means connected to said radar receiver and to said first pressure responsive means for receiving signals representing $A_8$ and $P_{SN}$ and for providing a signal representing total pressure at the nozzle entrance $P_{TN}$ according to the relationship $$P_{TN} = P_{SN} \cdot f(A_8)$$

second pressure responsive means for detecting ambient static pressure $P_{SO}$ and for providing a signal representing $P_{SO}$,
   second computer means connected to said radar receiver, to said first computer means, and to said second pressure responsive means for receiving signals representing $A_8$ and $P_{TN}$ and $P_{SO}$ and for providing a final output signal representing gross thrust $F_G$ according to the relationship $F_G = g(A_8, P_{TN}, P_{SO})$.

7. Apparatus for determining gross thrust in a jet engine having a diffuser, an afterbody in the diffuser, a tailpipe and a variable nozzle, said variable nozzle having a plurality of movable vanes defining an opening having an opening area $A_8$, said apparatus comprising a radar antenna mounted on said afterbody for directing a cone of radiation towards said nozzle, the peripheral portion of said cone of radiation impinging upon said vanes, and for receiving radiation reflected from said vanes, a pulse radar transmitter connected to said antenna for generating a pulse radar signal for radiation from said antenna, a radar receiver connected to said antenna for receiving reflected radiation related to the area $A_8$ and for providing an output signal representing $A_8$, first pressure responsive means for detecting static pressure at the nozzle entrance $P_{SN}$ and for providing a signal representing $P_{SN}$, first computer means connected to said radar receiver and to said first pressure responsive means for receiving signals representing $A_8$ and $P_{SN}$ and for providing a signal representing total pressure at the nozzle entrance $P_{TN}$ according to the relationship $P_{TN} = P_{SN} \cdot f(A_8)$ second pressure responsive means for detecting ambient static pressure $P_{SO}$ and for providing a signal representing $P_{SO}$, second computer means connected to said radar receiver, to said first computer means and to said second pressure responsive means for receiving signals representing $A_8$, $P_{TN}$ and $P_{SO}$ and for providing a signal representing gross thrust $F_G$ according to the relationship $F_G = g(A_8, P_{TN}, P_{SO})$.

8. Apparatus for determining gross thrust in a jet engine having a diffuser, an afterbody in the diffuser, a tailpipe and a variable nozzle, said variable nozzle having a plurality of movable vanes defining an opening having an opening area $A_8$, said apparatus comprising a transmitting and a receiving radar antenna each mounted on said afterbody both facing said nozzle, said transmitting antenna adapted and arranged to direct a cone of radiation towards said nozzle, the peripheral portion of said cone of radiation impinging upon said vanes, and said receiving antenna for receiving radiation reflected from said vanes, a radar transmitter connected to said transmitting antenna for generating a continuous radar signal for radiation from said antenna, a radar receiver connected to said receiving antenna for receiving reflected radiation related to the area $A_8$ and for providing an output signal representing $A_8$, first pressure responsive means for detecting static pressure at the nozzle entrance $P_{SN}$ and for providing a signal representing $P_{SN}$, first computer means connected to said radar receiver and to said first pressure responsive means for receiving signals representing $A_8$ and $P_{SN}$ and for providing a signal representing total pressure at the nozzle entrance $P_{TN}$ according to the relationship $P_{TN} = P_{SN} \cdot f(A_8)$ second pressure responsive means for detecting ambient static pressure $P_{SO}$ and for providing a signal representing $P_{SO}$, second computer means connected to said radar receiver, to said first computer means and to said second pressure responsive means for receiving signals representing $A_8$, $P_{TN}$ and $P_{SO}$ and for providing a signal representing gross thrust $F_G$ according to the relationship $F_G = g(A_8, P_{TN}, P_{SO})$.

* * * * *